United States Patent [19]
Bratke et al.

[11] 3,803,938
[45] Apr. 16, 1974

[54] DEFORMABL SUPPORT FOR STEERING ASSEMBLY

[75] Inventors: Dieter N. Bratke, Russelsheim/Main; Klaus Brandel, Worrstadt, both of Germany

[73] Assignee: General Motors Corporation, Detroit, Mich.

[22] Filed: Jan. 26, 1973

[21] Appl. No.: 282,419

[30] Foreign Application Priority Data
Sept. 2, 1971  Germany.............................. 2143935

[52] U.S. Cl. ................................................ 74/492
[51] Int. Cl................................................ B62d 1/18
[58] Field of Search............ 74/492, 493; 280/150 B

[56] References Cited
UNITED STATES PATENTS
3,505,897  4/1970  Scheffler............................... 74/492

*Primary Examiner*—Allan D. Herrmann
*Attorney, Agent, or Firm*—D. L. Ellis

[57] ABSTRACT

A motor vehicle steering column assembly has a deformable support member secured to an upper tube portion of a steering shaft of the assembly, and the deformable support member is adapted to be secured to a frame member of the vehicle. The deformable support member has a hollow generally triangular cross-sectional configuration and may comprise two interconnected side pieces connected to a mechanically weaker base piece, and secured at the base piece to the upper tube portion of the steering column assembly, such that the base piece is inclined to the axis of the steering column and divergent therefrom in a direction towards the front of the vehicle when installed therein. The deformable support member may also be formed as a hollow prism-like body having the same general cross-sectional configuration as the above-mentioned deformable support member, by utilizing two such members interconnected by an intermediate portion and installed with the same orientation.

7 Claims, 5 Drawing Figures

DEFORMABL SUPPORT FOR STEERING ASSEMBLY

This invention relates to motor vehicle steering column assemblies.

When a vehicle is involved in a collision, and particularly a frontal collision, the driver of the vehicle is likely to be thrown against the steering wheel, and in order to reduce the gravity of injury which could result from this, the steering column assembly is so made as to be deformable under impact.

According to the invention a motor vehicle steering column assembly comprises: a telescopic steering shaft having an upper tube portion and a lower tube portion engaged for telescopic movement relative to one another; and a deformable support member, constituted by two side pieces connected together at their respective one ends, and connected at their other ends to the ends of a base piece constructed to be weaker than the side pieces, the pieces together forming a member, having a hollow generally triangular configuration, which is connected at the base piece to the upper tube portion and adapted to be connected at one side to a body portion of the vehicle; in an arrangement in which, when so connected, the application of an axial force to the steering column in a sense tending to shorten the length of the steering shaft urges the two sides of the deformable support member together and causes buckling of the base piece with consequent absorption of force, and on the application of an axial force to the steering column in a sense tending to lengthen the steering shaft the base piece acts as a tension member to resist such lengthening.

The invention provides an inexpensive way of incorporating a deformable member in the steering column assembly by utilizing a support member for the steering column assembly, thus avoiding the necessity of providing a separate specially designed deformable member, and it also has the additional advantage of compactness.

The appended claims define the scope of the monopoly claimed. How the invention can be performed is hereinafter particularly described with reference to the accompanying drawings in which:

Figure 1:
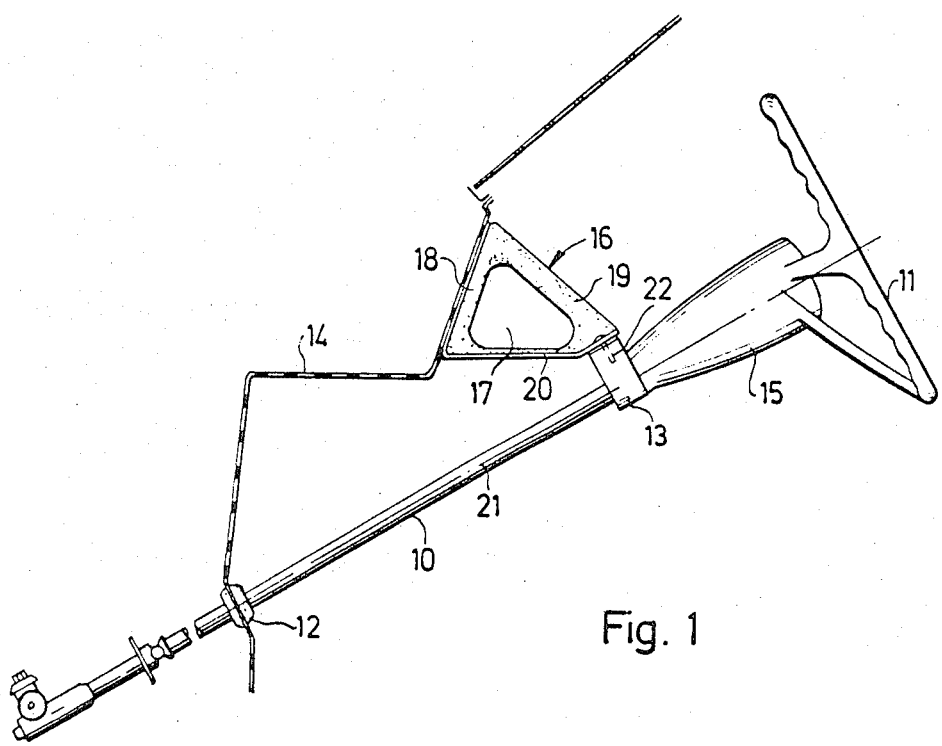
FIG. 1 shows a side view of a steering column assembly according to the invention.
Figure 2:
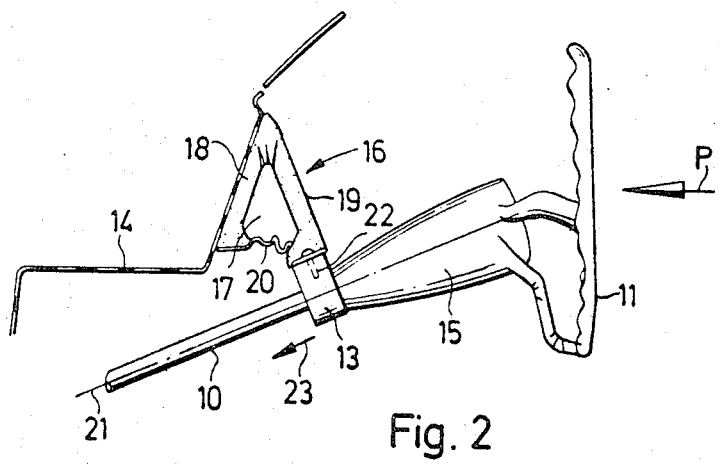
FIG. 2 shows part of the steering column assembly of FIG. 1 after impact of the driver against the steering wheel.

FIGS. 1 and 2 show a motor vehicle steering column assembly which has a steering shaft 10 with a steering wheel 11. The steering shaft 10 is mounted and supported at two points 12, 13 fixed to a part 14 of a frame portion of the vehicle. The steering wheel 11 fits into an upper tube portion or sleeve-like part 15 which is telescopically engaged with a lower tube portion constituted by an upper part of the steering shaft 10, so that the two tube portions can move relatively to one another when an impact force is applied to the steering column. In the normal position of the assembly shown in FIG. 1 telescopic displacement of the steering shaft 10 into the sleeve-like part 15 is prevented by the steering shaft bearing 13, which forms an axial stop for the sleeve-like part 15. triangular As can be seen in FIGS. 1 and 2, the upper steering shaft bearing 13 is indirectly connected to the vehicle frame 14, by means of a fastening element 16, constituting a deformable support member. The deformable support member 16 is formed as a hollow generally triagnular member and serves as an energy-absorbing deforming element should the driver be hurled against the driving wheel 11 in an accident. FIG. 2 shows the member deformed by such an impact. In FIG. 2 an arrow P denotes the impact force of the driver on the steering wheel 11 or the steering shaft 10.

Adjacent side pieces 18, 19 of the member differ in width from a base piece 20 of the member 16 and this is achieved by a cut-out 17, which can be effected by punching. The base piece 20 of the member 16 is weaker than the side pieces 18, 19 so that it is the easiest to deform under the effect of the impact force P. As shown in FIG. 1 the member 16 is mounted with its base piece inclined to the axis 21 of the steering column and divergent from the steering column in a direction towards the front of the vehicle (not shown). The member 16 has one side piece 18 fixed to the vehicle frame 14 and at the opposite side piece that is the point on the base piece 20 it is fixed to the steering shaft bearing 13 by means of screws 22. This arrangement provides for deformation of the member 16 when the steering wheel is hit by a load, the two side pieces 18, 19 can move towards each other while the base side 20 buckles into a corrugation. At the same time the steering shaft bearing 13 moves a corresponding amount in the direction of the arrow 23, permitting relative telescopic movement of the tube portions 10, 15 to shorten the length of the steering shaft. Because of the deformation of the member 16 the energy of impact is dissipated and is not transferred to the body of the driver and the chance of him being injured is lessened. The base piece 20 of the member 16 also serves as a tension member and prevents the steering shaft 10 and the sleeve-like part 15 and the steering wheel 11 from being knocked further into the vehicle when the force of impact is so great that the steering column assembly receives a thrust from the front of the vehicle in addition to deformation of the front part of the bodywork (not shown) which impact force would act in the opposite direction to that indicated by the arrow P in FIG. 2.

Figure 3:
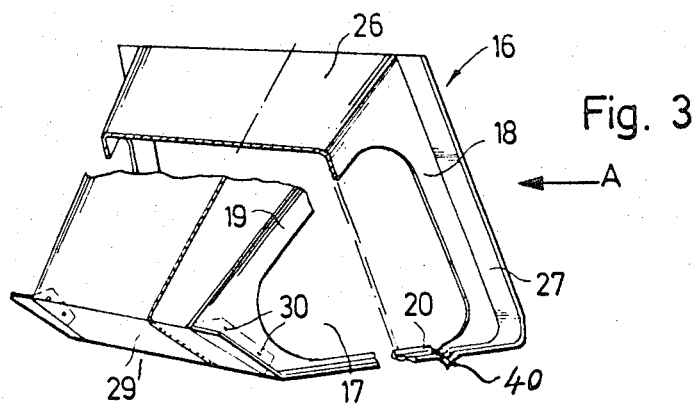
FIG. 3 shows a perspective view of one embodiment of a deformable support member of an assembly according to the invention.
Figure 4:
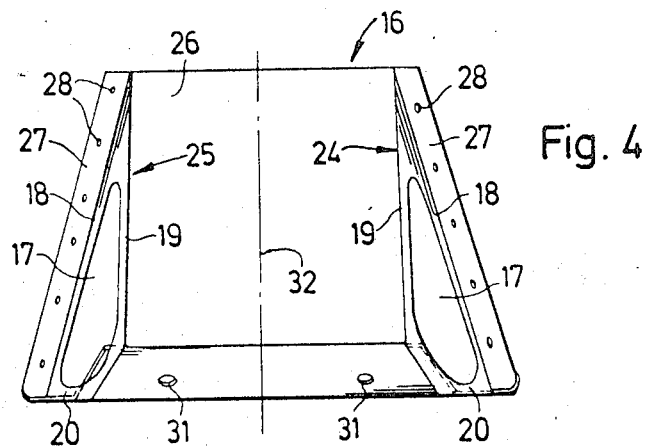
FIG. 4 is a view of the deformable support member in the direction of the arrow A in FIG. 3.
Figure 5:
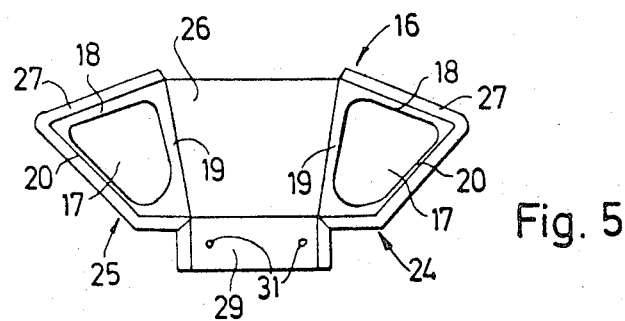
FIG. 5 is a development of the deformable support member of FIGS. 3 and 4.

In FIGS. 1 and 2 the member 16 is shown as generally flat. A three-dimensional design is shown in FIGS. 3 to 5. This embodiment shows a construction which has more strength sideways, that is transverse to the direction of the force P, than a generally flat design. In the embodiment shown in FIGS. 3 to 5 like parts to those shown in FIGS. 1 and 2 have the same reference numerals since the embodiment of the member shown in FIGS. 3 to 5 could be substituted for the member 16 shown in FIGS. 1 and 2. In FIGS. 3 to 5 the member 16 consists of a pair of side pieces 24, 25 laterally spaced from each other, and interconnected by means of a sheet metal connecting piece 26 to form a prism-like body. The side pieces 18 and the base piece 20 of each part 24, 25 have flanges 27 which serve for fastening the member 16 to the vehicle frame 14 (FIGS. 1 and 2), fo which purpose the flanges 27 have holes 28 for screws, rivets, or the like.

As can be seen from FIG. 5, the side pieces 24, 25 and the connecting piece or intermediate plate 26 form a common part in one piece formed from a common blank which can be folded to form the member 16. The two side pieces 24, 25 are fixed in position by a tongue edge 29 riveted to parts 30 (FIG. 3) of the side pieces 27, 28. The egde 29 has holes 31 (FIGS. 4 and 5) for screws 22 by which the member is secured to the frame 14. The member 16 is fastened symmetrically to the car body so that its median plane, which is represented in FIG. 4 by a dot-dash line 32, coincides with the longitudinal axis 21 of the steering shaft 10. To achieve deformation of the member 16 in a design manner the base piece 20 of the member has a number of creases, such as the one 40 in FIG. 3.

I claim:

1. A motor vehicle steering column assembly comprising:
    an upper tube portion;
    a lower tube portion telescopically engaged with said upper portion for movement of the portions relative to one another, the portions constituting a steering shaft of the assembly;
    a deformable support member having a hollow generally triangular cross-sectional configuration defined by two strip-like side pieces interconnected at respective one ends of the side pieces and, interconnecting their other ends, a strip-like base piece mechanically weaker than said side pieces;
    means directly connecting said member to said upper tube portion;
    one of said side pieces being adapted to be connected to a frame member of a motor vehicle in which said assembly is adapted to be installed, such that said assembly thereby provides an arrangement whereby application of axial force to the steering shaft in a sense tending to shorten the length thereof urges the two side pieces together and causes the base piece of the deformable support member to buckle with consequent absorption of said force, and on the application of an axial force to the steering shaft in a sense tending to lengthen it, the base piece acts as a tension member to resist said lengthening.

2. A motor vehicle steering column assembly comprising:
    an upper tube portion;
    a lower tube portion telescopically engaged with said upper portion for movement of the portions relative to one another, the portions constituting a steering shaft of the assembly;
    a deformable support member having a hollow generally triangular cross-sectional configuration defined by two strip-like side pieces interconnected at respective one ends of the side pieces and, interconnecting their other ends, a strip-like base piece mechanically weaker than said side pieces;
    a collar surrounding said upper tube portion and having an extension portion secured to an end portion of said base piece to secure said deformable support member to said upper tube portion with said base piece inclined to the axis of the steering shaft and divergent from said steering shaft in a direction towards the front of a vehicle in which said assembly is adapted to be installed;
    one of said side pieces being adapted to be connected to a frame member of a motor vehicle in which said assembly is adapted to be installed, such that said assembly thereby provides an arrangement whereby application of axial force to the steering shaft in a sense tending to shorten the length thereof urges the two side pieces together and causes the base piece of the deformable support member to buckle with consequent absorption of said force, and on the application of an axial force to the steering shaft in a sense tending to lengthen it, the base piece acts as a tension member to resist said lengthening.

3. A motor vehicle steering column assembly comprising:
    an upper tube portion;
    a lower tube portion telescopically engaged with said upper portion for movement of the portions relative to one another, the portions constituting a steering shaft of the assembly;
    a deformable support member in the form of a spaced pair of end portions with an intermediate portion interconnecting said end portions to form a hollow prism-like body, each of said end portion being defined by two strip-like side pieces having interconnected respective one ends, and, interconnecting other ends of said side pieces, a strip-like base piece mechanically weaker than said side pieces;
    a collar surrounding said upper tube portion and having an extension portion secured to an end portion of said base piece to secure said deformable support member to said upper tube portion with said base pieces inclined to the axis of the steering shaft and divergent from said steering shaft in a direction towards the front of the vehicle in which said assembly is adapted to be installed;
    said deformable support member being adapted to be connected to a frame member of the motor vehicle in which said assembly is adapted to be installed, such that said assembly thereby provides an arrangement whereby application of axial force to the steering shaft in a sense tending to shorten the length thereof urges the two side pieces together and causes the base pieces of the deformable support member to buckle with consequent absorption of said force, and on the application of an axial force to the steering shaft in a sense tending to lengthen it, the base pieces act as a tension member to resist said lengthening.

4. A motor vehicle steering column assembly as claimed in claim 3, wherein the axis of the steering shaft lies in the median plane of the deformable support member.

5. In a motor vehicle having a frame member and a steering column assembly connected thereto, said steering column assembly having an upper tube portion and a lower tube portion telescopically engaged therewith, the improvement comprising: a deformable support member in the form of a spaced pair of end portions with an intermediate portion interconnecting said end portions to form a hollow prism-like body, each of said end portions being defined by two strip-like side pieces having interconnected respective one ends, and, interconnecting other ends of said side pieces, a strip-like base piece mechanically weaker than said side pieces; means directly connecting said member to said upper tube portion; means directly connecting said deformable support member to said frame member such that said assembly thereby provides an arrangement whereby application of an axial force to the steering column in a sense tending to shorten the length thereof urges the side pieces of each end portion towards one another and causes the base pieces to buckle with consequent absorption of said force, and on the application of an axial force to the steering column in a sense tending to lengthen it, the base pieces act as tension members to resist said lengthening.

6. A motor vehicle steering column assembly comprising:
an upper tube portion;
a lower tube portion telescopically engaged with said upper portion for movement of the portions relative to one another, the portions constituting a steering shaft of the assembly;
a deformable support member in the form of a spaced pair of end portions with an intermediate portion interconnecting said end portions to form a hollow prism-like body, each of said end portions being defined by two strip-like side pieces having interconnected respective one ends, and, interconnecting other ends of said side pieces, a strip-like base piece mechanically weaker than said side pieces, said end portions and said intermediate portion being formed by stamping and folding operations as a one-piece body from a sheet metal blank;
a collar surrounding said upper tube portion and having an extension portion secured to an end portion of said base piece to secure said deformable support member to said upper tube portion with said base pieces inclined to the axis of the steering shaft and divergent from said steering shaft in a direction towards the front of the vehicle in which said assembly is adapted to be installed;
said deformable support member being adapted to be connected to a frame member of a motor vehicle in which said assembly is adapted to be installed, such that assembly thereby provides an arrangement whereby application of axial force to the steering shaft in a sense tending to shorten the length thereof urges the two side pieces together and causes the base piece of the deformable support member to buckle with consequent absorption of said force, and on the application of an axial force to the steering shaft in a sense tending to lengthen it, the base piece acts as a tension member to resist said lengthening.

7. A motor vehicle steering column assembly as claimed in claim 6, wherein said base pieces have creases formed therein whereby said base pieces are locally weakened so as to buckle in a design manner upon application of said axial force to said steering shaft in a sense tending to shorten the length thereof.

* * * * *